United States Patent
Sethi (10) Patent No.: US 12,098,993 B2
(45) Date of Patent: Sep. 24, 2024

(54) DEVICES AND METHODS FOR DETERMINING IMPEDANCE OF SINGLE BIOLOGICAL CELLS

(71) Applicant: TDK Corporation, Tokyo (JP)

(72) Inventor: Rakesh Sethi, San Jose, CA (US)

(73) Assignee: TDK CORPORATION, Tokyo (JP)

(*) Notice: Subject to any disclaimer, the term of this patent is extended or adjusted under 35 U.S.C. 154(b) by 299 days.

(21) Appl. No.: 17/114,881

(22) Filed: Dec. 8, 2020

(65) Prior Publication Data

US 2022/0178864 A1     Jun. 9, 2022

(51) Int. Cl.
*G01N 15/1031* (2024.01)
*G01N 15/01* (2024.01)

(52) U.S. Cl.
CPC ......... *G01N 15/1031* (2013.01); *G01N 15/01* (2024.01)

(58) Field of Classification Search
CPC ....... G01N 15/1031; G01N 2015/0065; G01N 2015/1006; G01N 2015/1062; G01N 15/00; G01R 27/02
USPC ....................................................... 422/82.01
See application file for complete search history.

(56) References Cited

U.S. PATENT DOCUMENTS

| | | | |
|---|---|---|---|
| 6,235,520 B1 * | 5/2001 | Malin | B01L 3/5085 204/403.01 |
| 2005/0249667 A1 * | 11/2005 | Tuszynski | A61N 7/00 424/9.3 |
| 2020/0101456 A1 * | 4/2020 | Watkins | G01N 15/1056 |
| 2022/0055031 A1 * | 2/2022 | Lichtenstein | G01N 33/56966 |

FOREIGN PATENT DOCUMENTS

| | | |
|---|---|---|
| CN | 114624516 A | 6/2022 |
| EP | 4012379 A | 6/2022 |

OTHER PUBLICATIONS

Extended European Search Report issued in corresponding European Patent Application No. 21213177.5 dated Apr. 19, 2022.
Microwave Frequency, Encyclopedia of Modern Optics, 2005.

* cited by examiner

*Primary Examiner* — Jill A Warden
*Assistant Examiner* — Jacqueline Brazin
(74) *Attorney, Agent, or Firm* — Morgan, Lewis & Bockius LLP (57) ABSTRACT

A device for analyzing biological cells is disclosed. The device includes a first platter for positioning a first group of biological cells; a first head positioned adjacently to the first platter for providing first electromagnetic radiation to at least a first subset of the first group of biological cells; and a first electrode positioned adjacently to the first platter for detecting the first electromagnetic having interacted with the first subset of the first group of biological cells for determining impedance values for the first subset of the first group of biological cells.

16 Claims, 7 Drawing Sheets

710 Provide, with a first head positioned adjacently to a first platter, first electromagnetic radiation to at least a first subset of a first group of biological cells positioned with the first platter

712 Rotate the first platter while the first electromagnetic radiation is being provided so that a plurality of biological cells of the first group receive the first electromagnetic radiation sequentially

714 Change a frequency of the first electromagnetic radiation while the first platter rotates

720 Detect, with a first electrode positioned adjacently to the first platter, the first electromagnetic radiation having interacted with at least the first subset of the first group of biological cells

730 Determine, with one or more processors, one or more impedance values for the first subset of the first group of biological cells based on the first electromagnetic radiation detected by the first electrode

740 Provide, with a second head, second electromagnetic radiation concurrently with providing the first electromagnetic radiation with the first head. Detect, with a second electrode, the second electromagnetic radiation having interacted with at least a second subset of the first group of biological cells. Determine one or more impedance values for the second subset of the first group of biological cells based on the first electromagnetic radiation detected by the second electrode.

742 The first electromagnetic radiation has a first frequency and the second electromagnetic radiation has a second frequency that is distinct from the first frequency

750 Provide, with a third head, third electromagnetic radiation concurrently with providing the first electromagnetic radiation with the first head. Detect, with a third electrode, the third electromagnetic radiation having interacted with at least a subset of a second group of biological cells. Determine, with the one or more processors, one or more impedance values for the subset of the second group of biological cells based on the third electromagnetic radiation detected by the third electrode.

Figure 7

DEVICES AND METHODS FOR DETERMINING IMPEDANCE OF SINGLE BIOLOGICAL CELLS

TECHNICAL FIELD

This application relates generally to impedance sensors, and more particularly to impedance sensors for biological cells.

BACKGROUND

Cell identification and counting play an important role in medical diagnostics and life sciences research. Advancements in cell identification and counting technologies have enabled rapid and automated cell identification and counting.

Conventional methods for cell analysis include delivering through a fluidic channel (e.g., flow cytometry). However, challenges associated with fluidic mechanics have limited the throughput of such methods.

SUMMARY

The devices and methods described herein address challenges associated with conventional devices and methods for identifying and counting biological cells.

In accordance with some embodiments, a device for analyzing biological cells includes a first platter for positioning a first group of biological cells; a first head positioned adjacently to the first platter for providing first electromagnetic radiation to at least a first subset of the first group of biological cells; and a first electrode positioned adjacently to the first platter for detecting the first electromagnetic having interacted with the first subset of the first group of biological cells for determining impedance values for the first subset of the first group of biological cells.

In accordance with some embodiments, a method includes providing, with a first head positioned adjacently to a first platter, first electromagnetic radiation to at least a first subset of a first group of biological cells positioned with the first platter; detecting, with a first electrode positioned adjacently to the first platter, the first electromagnetic radiation having interacted with at least the first subset of the first group of biological cells; and determining, with one or more processors, one or more impedance values for the first subset of the first group of biological cells based on the first electromagnetic radiation detected by the first electrode.

Thus, the disclosed devices and methods allow determining impedance of biological cells using electromagnetic radiation. The determined impedance can be used for counting and identifying biological cells and in some cases, subcellular components. The disclosed devices and methods may replace, or complement, conventional devices and methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 7 is a flow diagram illustrating a method of analyzing biological cells in accordance with some embodiments.

DESCRIPTION OF EMBODIMENTS

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cantilever could be termed a second cantilever, and, similarly, a second cantilever could be termed a first cantilever, without departing from the scope of the various described embodiments. The first cantilever and the second cantilever are both cantilevers, but they are not the same cantilever.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
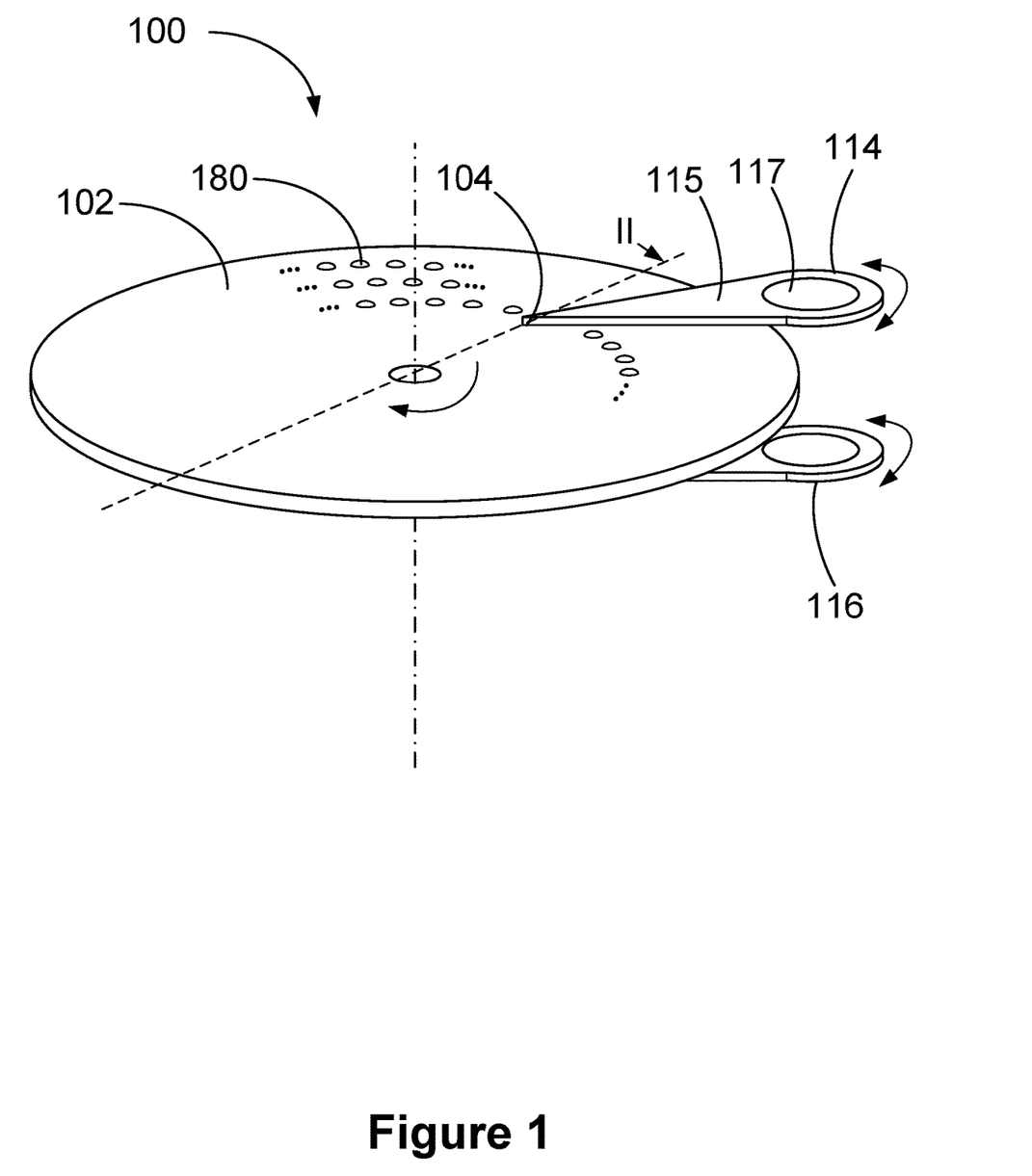
FIG. 1 shows a device for analyzing biological cells in accordance with some embodiments.

FIG. 1 shows a device 100 for analyzing biological cells in accordance with some embodiments.

The device 100 includes a platter 102 for positioning a first group of biological cells 180. For example, the biological cells may be positioned (directly or indirectly) on the platter 102, over the platter 102, or at least partially in the platter 102. In some embodiments, the biological cells 180 are positioned on only one (substantially planar) surface of the platter 102. In some embodiments, the biological cells 180 are positioned on both (substantially planar) surfaces of the platter 102.

The device also includes a head 104 positioned adjacently to the platter 102 for providing first electromagnetic radiation to at least a first subset of the first group of biological cells 180. In FIG. 1, the head 104 is coupled with a head actuator 114 for moving the head 104 relative to the platter 102. For example, the head actuator 114 moves the head 104 in a direction that is not perpendicular to a radial direction of the platter 102 so that the head 104 can move over between an inside track (e.g., located adjacent to a center of the platter 102) and an outside track (e.g., located away from the center of the platter 102) of the platter 102. In some embodiments, the head actuator 114 includes an arm 115 and a motor 117 (e.g., a stepper motor) coupled with the arm 115.

Electromagnetic radiation may have any frequency (e.g., between 1 KHz and 30 THz). In some implementations, the electromagnetic radiation includes microwave electromagnetic radiation having a frequency between 1 to 1000 GHz. In some implementations, the electromagnetic radiation has a frequency between 3 to 30 GHz. In some implementations, the electromagnetic radiation has a frequency on the order of KHz to MHz (e.g., between 1 KHz to 1000 MHz).

The device 100 further includes an electrode positioned adjacently to the platter 102 for detecting the first electromagnetic having interacted with the first subset of the first group of biological cells 180 for determining impedance values for the first subset of the first group of biological cells 180. In some embodiments, the device includes an electrode actuator 116 for moving the electrode relative to the platter 102. For example, the electrode actuator 116 moves the electrode in a direction that is not perpendicular to the radial direction of the platter 102 so that the electrode can move under between the inside track and the outside track of the platter 102.

In some embodiments, the electrode is positioned at a location corresponding to a location of the head 104 (e.g., the head 104 may be located above the platter 102 and the electrode may be located under the platter 102, or vice versa, with their lateral locations corresponding to each other). For example, a controller provides electrical signals to both the head actuator 114 and the electrode actuator 116 so that both the head 104 and the electrode are positioned at laterally corresponding locations (e.g., the head 104 is located directly above or below the electrode).

Although FIG. 1 shows that the head 104 and the electrode are moved by two separate actuators, namely the head actuator 114 and the electrode actuator 116, in some embodiments, a single actuator moves both the head 104 and the electrode concurrently.

Figure 2:
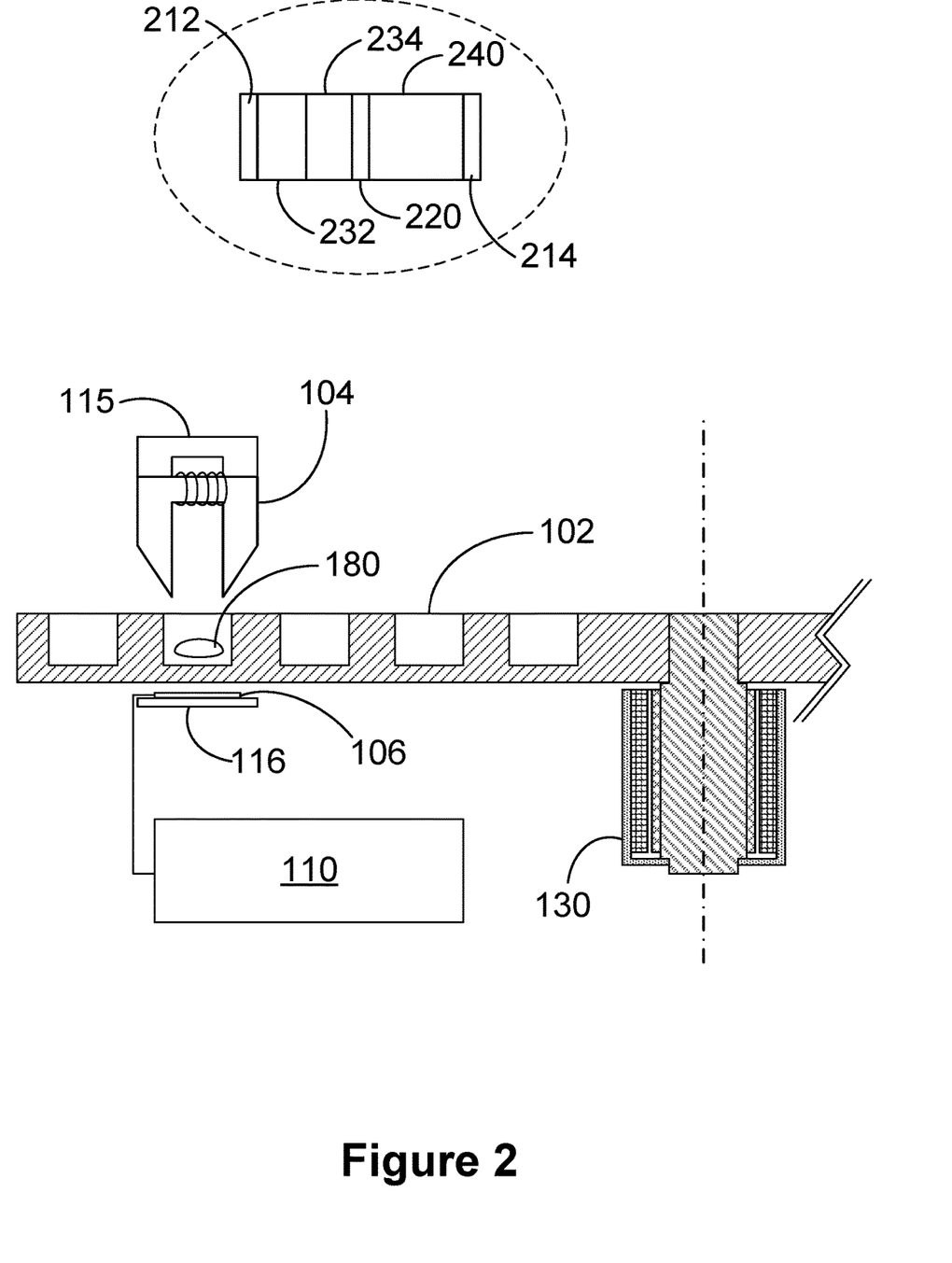
FIG. 2 is a cross-sectional view of the device shown in FIG. 1 in accordance with some embodiments.

FIG. 2 is a cross-sectional view of the device shown in FIG. 1 in accordance with some embodiments.

In addition to the platter 102 and the head 104 shown in FIG. 1, FIG. 2 shows an electrode 106 for detecting the first electromagnetic having interacted with the first subset of the first group of biological cells 180, and a platter actuator 130 (e.g., an assembly including a motor, such as a stepper motor) for rotating the platter 102 (e.g., spinning the platter 102 about an axis of rotational symmetry for the platter 102). For example, the platter actuator 130 includes a rotatable shaft that is coupled with the platter 102 (e.g., at least while the head 104 provides the first electromagnetic radiation). In FIG. 2, the electrode 106 is mounted on the electrode actuator 116.

FIG. 2 also shows that the electrode 106 is electrically coupled with an electrical circuit 110 for reading the electrical signals (e.g., radio-frequency signals) detected by the electrode 106.

In some embodiments, the head 104 includes a coil, as shown in FIG. 2, for providing electromagnetic radiation. In some embodiments, the head 104 includes an oscillator (e.g., a combination of the coil or an inductor with a capacitor). In some embodiments, the oscillator generates microwave electromagnetic radiation. In some embodiments, the head 104 is configured to change a frequency of the generated electromagnetic radiation (e.g., by changing a capacitance of the capacitor coupled with the inductor) so that the impedance can be measured at multiple frequencies of the electromagnetic radiation or scanned over a range of frequencies. Such scanning allows broadband electrical detection of cells, which can differentiate, for example, live and dead cells.

Shown in the inset of FIG. 2 is another structure of a head, which can provide a localized magnetic field. The head includes electrodes 212 and 214 and a metallic interlayer 220 together with a field generation layer 234 and a layer 232 with perpendicular anisotropy between the electrode 212 and the metallic interlayer 220, and a perpendicularly magnetized reference layer 240 located between the electrode 214 and the metallic interlayer 220. In some implementations, once an electrical field is applied to the electrodes 212 and 214, an oscillating stack (e.g., a combination of the layers 232 and 234) produces precession of magnetic dipoles in the layer 234. This precessing dipole is a function of the injected current density and it creates an alternating current field on a single biological cell 180. The resulting current and/or voltage can be used to measure the real and imaginary components of the cell impedance.

Other head structures may be used for providing electromagnetic radiation.

Figure 3:
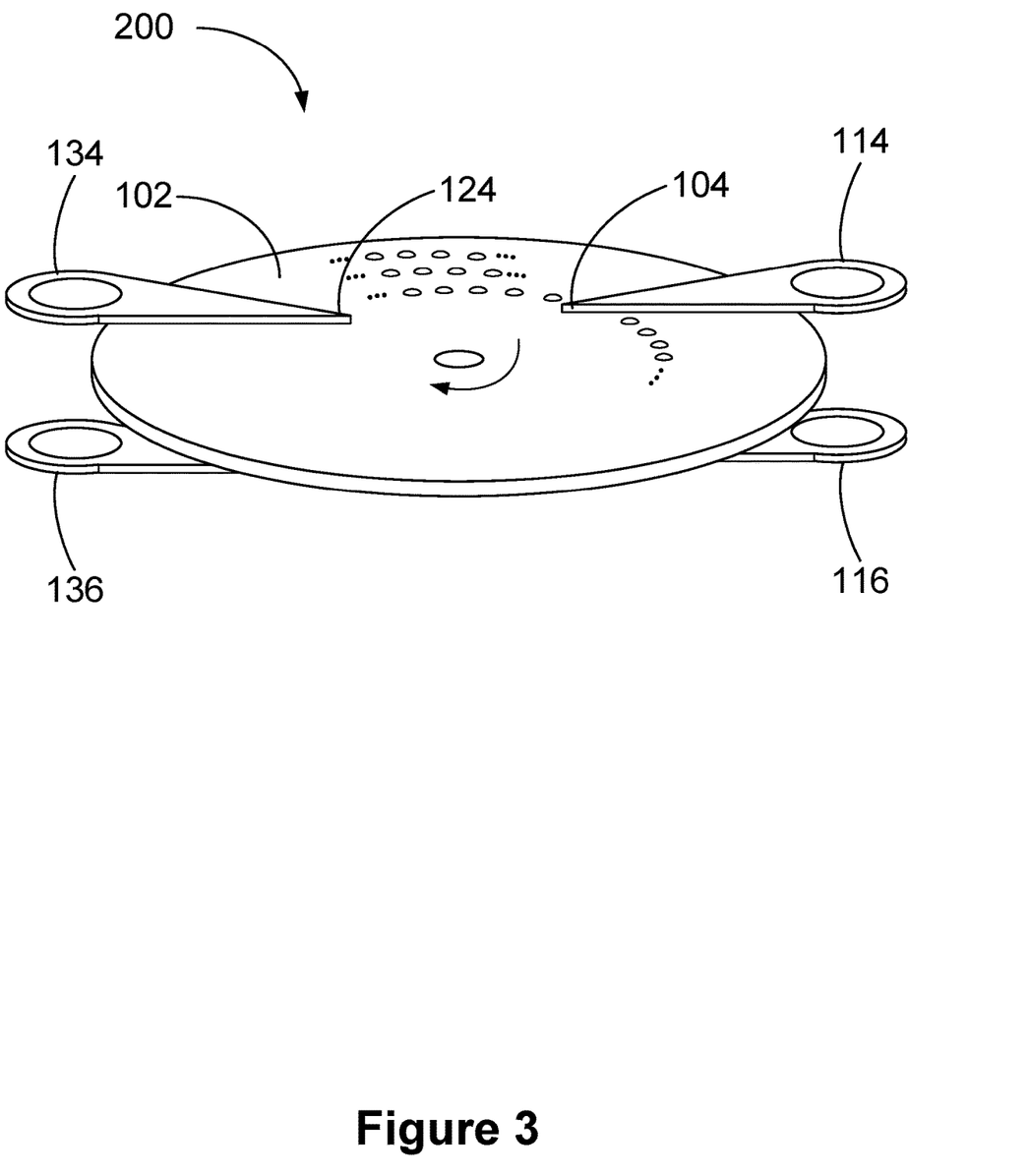
FIG. 3 shows a device for analyzing biological cells in accordance with some embodiments.

FIG. 3 shows a device 200 for analyzing biological cells in accordance with some embodiments. The device 200 is similar to the device 100 shown in FIG. 1, except that the device 200 includes a second head 124 (which may be coupled to a second head actuator 134) and a second electrode (which may be coupled to a second electrode actuator 136). The second head 124 is distinct from the first head 104 and is positioned at a location distinct from a location of the first head 104. Yet, the second head 124 is positioned adjacently to the platter 102 for providing second electromagnetic radiation (e.g., to biological cells positioned with the platter 102). Similarly, the second electrode is positioned at a location distinct from a location of the first electrode. The second electrode is positioned adjacently to the platter 102 for detecting the second electromagnetic radiation having interacted with at least a second subset of the first group of biological cells for determining impedance values for the second subset of the first group of biological cells.

Although FIG. 3 shows two heads 104 and 124, in some embodiments, the device 200 may include three or more heads. Similarly, in some embodiments, the device 200 may include three or more electrodes for detecting electromagnetic radiations having interacted with one or more subsets of the first group of biological cells.

In some embodiments, the head 104 and the second head 124 are configured to provide electromagnetic radiations having a corresponding frequency. When the first subset and the second subset are identical or include common biological cells, this allows second determination of impedance values (e.g., for the same biological cells), which may be used to improve the reliability and accuracy of the determined impedance values. Alternatively, when the first subset and the second subset are mutually exclusive, the first head 104 and the second head 124 may be positioned for determining impedance values of different biological cells. For example, when the cells are arranged like tracks of a hard-disk drive, the first head 104 is positioned for odd-numbered tracks while the second head 124 is positioned for even-numbered tracks. This increases the scan speed so that impedance values of more biological cells for electromagnetic radiation of a particular frequency can be determined for a given amount of time.

In some embodiments, the first electromagnetic radiation has a first frequency and the second electromagnetic radiation has a second frequency that is distinct from the first frequency. For example, the head 104 and the second head 124 may provide electromagnetic radiation of different frequencies so that the head 104 (and the associated electrode) are used for determining impedance values of biological cells at a first frequency and the second head 124 (and the associated second electrode) are used for determining impedance values of biological cells at a second frequency. The head 104 and the second head 124, for example, may be configured to provide electromagnetic radiation of different frequencies by using capacitors having different capacitance values and/or inductors having different inductance values in the oscillator circuits of the heads 104 and 124.

Figure 4:
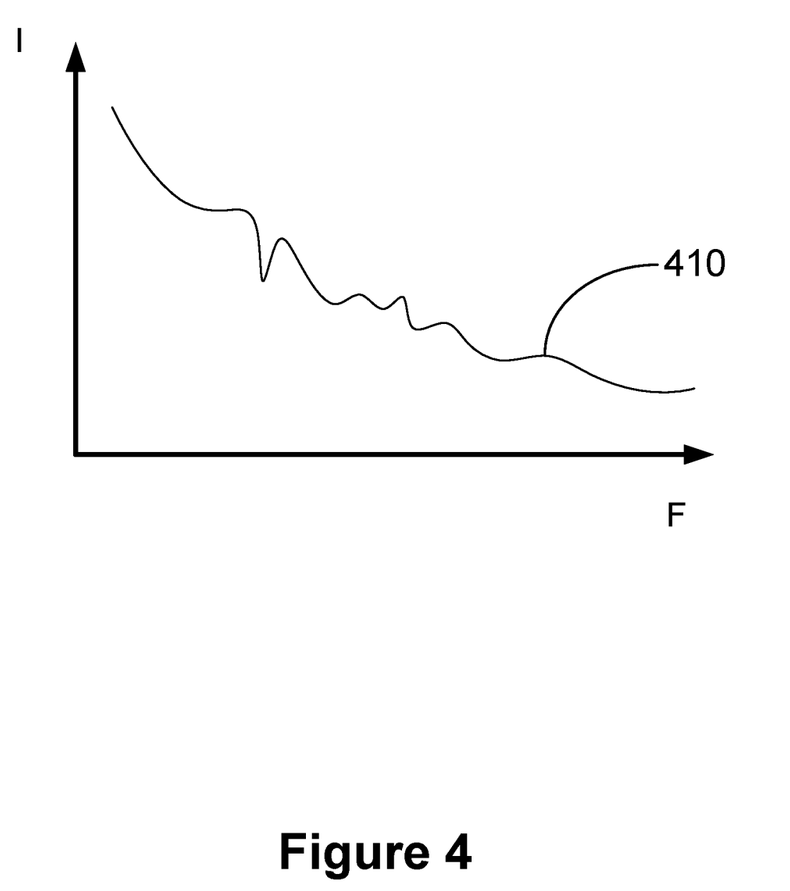
FIG. 4 is an example impedance graph in accordance with some embodiments.

FIG. 4 is an example impedance graph in accordance with some embodiments. The graph shows an impedance function 410 with impedance values of a particular biological cell for a range of electromagnetic radiation frequencies. Instead using a single impedance value, using an impedance function allows better identification and counting of cells (e.g., the precision and accuracy are improved over using a single impedance value).

Figure 5:
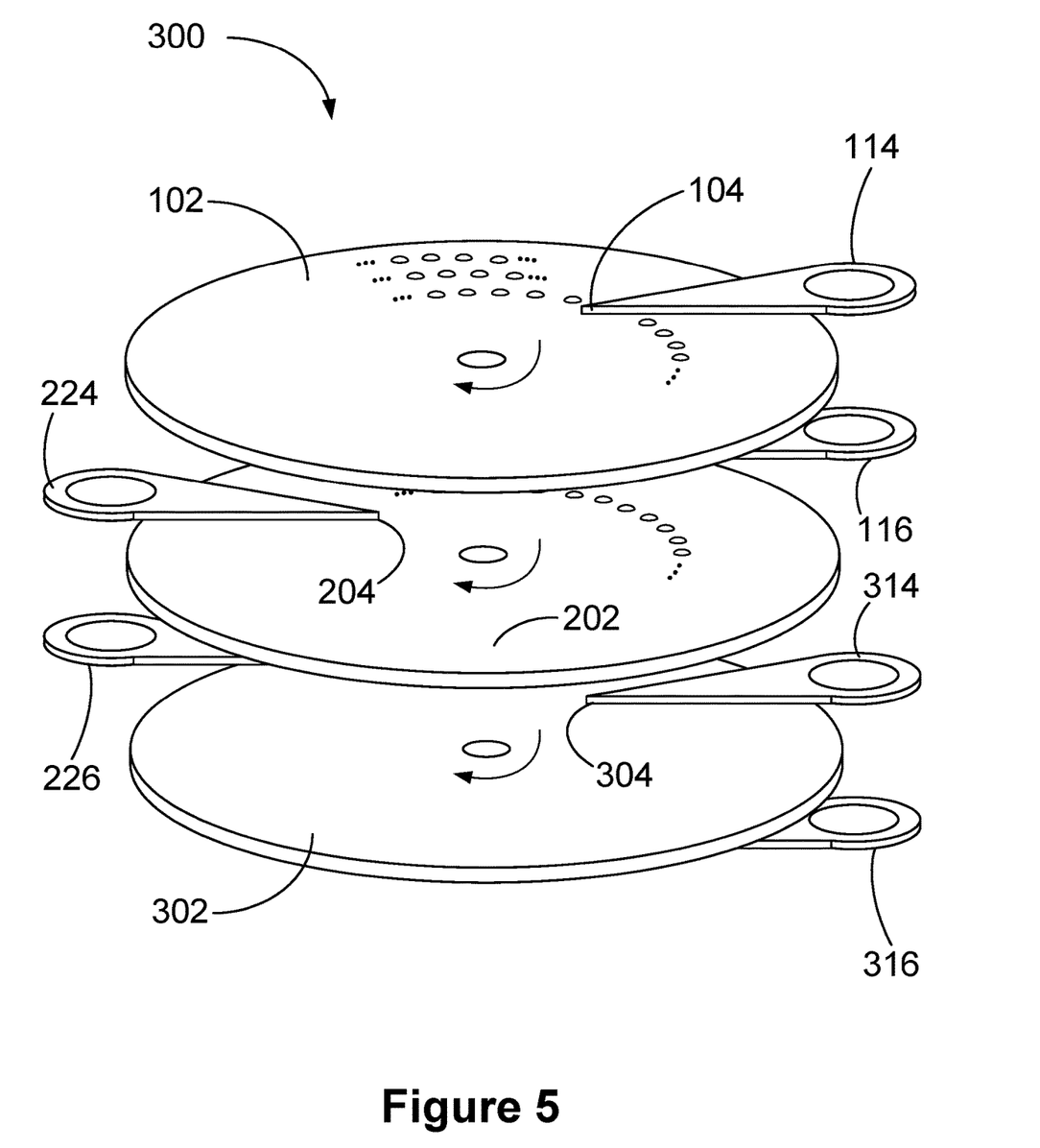
FIG. 5 shows a device for analyzing biological cells in accordance with some embodiments.

FIG. 5 shows a device 300 for analyzing biological cells in accordance with some embodiments. The device 300 is similar to the device shown in FIG. 1, except that the device 300 includes multiple platters, such as a second platter 202 and a third platter 302. Although FIG. 5 shows that the device 300 has three platters, in some embodiments, the device 300 may have fewer platters (e.g., two platters) or more platters (e.g., four or more platters).

FIG. 5 also shows that each platter is coupled with at least one head and at least one electrode. For example, the second platter 202 is coupled with a head 204 (coupled with a head actuator 224) and a corresponding electrode (coupled with an electrode actuator 226), and the third platter 302 is coupled with a head 304 (coupled with a head actuator 314) and a corresponding electrode (coupled with an electrode actuator 316). In some embodiments, at least one platter of the multiple platters is coupled with two or more heads and two or more electrodes, in a manner analogous to that shown in FIG. 3. Multiple platters provide an increased capacity so that additional biological cells may be analyzed by the device. In addition, because biological cells are arranged on multiple platters, additional heads and electrodes may be used to further increase the speed of analyzing biological cells. Furthermore, the use of multiple platters allows each platter to be rotated at different speeds (e.g., depending on the required scanning time and/or accuracy).

In some embodiments, at least one platter (e.g., platter 302) of the multiple platters is used as a reference platter. The reference platter may have biological cells (e.g., biological cells different from the biological cells on other platters, such as control biological cells) thereon or may not have biological cells (e.g., the reference platter may be with or without biological cells). One or more electrodes are positioned adjacently to the reference platter for detecting electromagnetic radiation. The electromagnetic radiation detected using the reference platter may be used to process electrical signals from electrodes coupled with other platters (e.g., for canceling noises, etc.).

Figure 6:
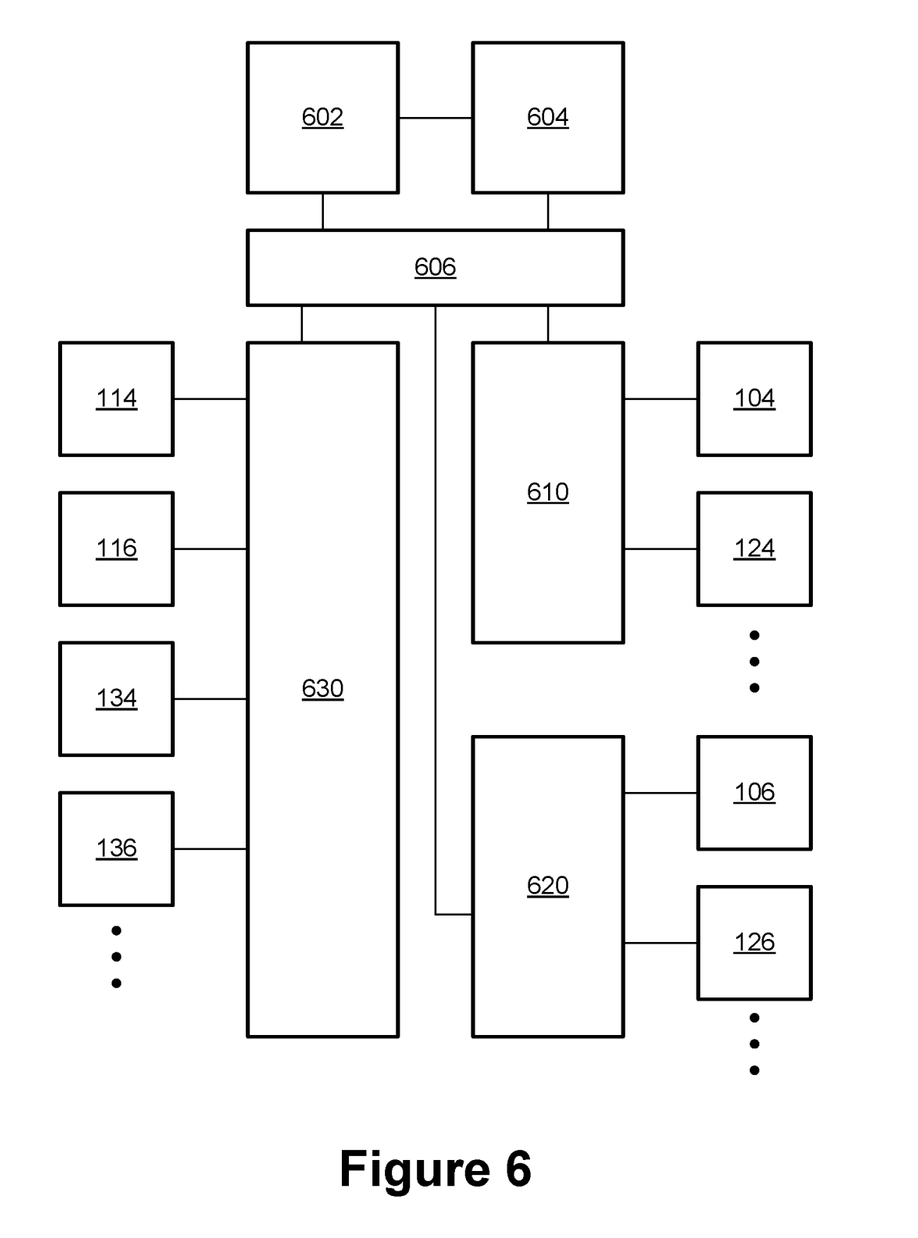
FIG. 6 is a block diagram illustrating electrical components for analyzing biological cells in accordance with some embodiments.

FIG. 6 is a block diagram illustrating electrical components for analyzing biological cells in accordance with some embodiments.

In some embodiments, the device for analyzing biological cells includes one or more processors 602 and memory 604. In some embodiments, the memory 604 includes instructions for execution by the one or more processors 602. In some embodiments, the stored instructions include instructions for receiving electrical signals indicative of one or more impedance values for the first subset of the first group of biological cells (e.g., from the electrodes) and instructions for determining the one or more impedance values for the first subset of the first group of biological cells from the received electrical signals. In some embodiments, the stored instructions also include instructions for storing the one or more impedance values for the first subset of the first group of biological cells (e.g., within the memory 604 or another storage device).

In some embodiments, the device also includes an electrical interface 606 coupled with the one or more processors 602 and the memory 604.

In some embodiments, the device further includes an actuator driver circuit 630, which is coupled to one or more actuators, such as the head actuator 114, the electrode actuator 116, the second head actuator 134, and the second electrode actuator 136. The actuator driver circuit 630 sends electrical signals to the one or more actuators 114, 116, 134, and 136 to initiate movement of the one or more actuators.

In some embodiments, the device includes a head driver circuit 610, which is coupled to one or more heads, such as the head 104 and the second head 124. The head driver circuit 610 sends electrical signals to the one or more heads 104 and 124 to generate electromagnetic radiation using the one or more heads.

In some embodiments, the device includes a readout circuit 620 (e.g., electrical circuit 110) coupled with one or more electrodes, such as the electrode 106 and an electrode 126 (which may be coupled to the second electrode actuator 136). The readout circuit 620 receives electrical signals from the one or more electrodes 106 and 126 and relays the electrical signals to the one or more processors (with or without processing, such as filtering, etc.).

FIG. 7 is a flow diagram illustrating a method 700 of analyzing biological cells in accordance with some embodiments.

The method 700 includes (710) providing, with a first head positioned adjacently to a first platter, first electromagnetic radiation to at least a first subset of a first group of biological cells positioned with the first platter (e.g., the head 104 positioned adjacent to the platter 102 provides the first electromagnetic radiation to at least a subset of biological cells 180 on the platter 102).

In some embodiments, the method 700 includes (712) rotating the first platter while the first electromagnetic radiation is being provided so that a plurality of biological cells of the first group receive the first electromagnetic radiation sequentially (e.g., using the platter actuator 130).

In some embodiments, the method 700 includes (714) changing a frequency of the first electromagnetic radiation while the first platter rotates. For example, the frequency of the first electromagnetic radiation is gradually changed to cover a certain frequency range so that impedance values of the biological cell for the frequency range can be obtained. In some cases, the impedance values of the biological cell over the frequency range (which may be plotted as a graph as shown in FIG. 4) may be used to identify the biological cell.

The method 700 includes (720) detecting, with a first electrode positioned adjacently to the first platter, the first electromagnetic radiation having interacted with at least the first subset of the first group of biological cells. For example, the electrical signals detected by the electrode 106 is read, or quantized, by the electrical circuit 110.

The method 700 includes (730) determining, with one or more processors, one or more impedance values for the first subset of the first group of biological cells based on the first electromagnetic radiation detected by the first electrode. For example, the one or more processors 602 process the electrical signals from the electrical circuit 110 (e.g., filtering, averaging, scaling, etc.) to determine one or more impedance values of one or more biological cells. In some embodiments, determining the one or more impedance values includes determining an attenuation and a phase delay (e.g., for determining real and imaginary components of the impedance value).

In some embodiments, the method includes (740) providing, with a second head (e.g., the second head 124) positioned adjacently to the first platter, second electromagnetic radiation concurrently with providing the first electromagnetic radiation with the first head; detecting, with a second electrode positioned adjacently to the first platter, the second electromagnetic radiation having interacted with at least a second subset of the first group of biological cells; and determining, with the one or more processors, one or more impedance values for the second subset of the first group of biological cells based on the first electromagnetic radiation detected by the second electrode.

In some embodiments, the first electromagnetic radiation has (742) a first frequency and the second electromagnetic radiation has a second frequency that is distinct from the first frequency.

In some embodiments, the method 700 includes (750) providing, with a third head (e.g., the third head 204) positioned adjacent to a second platter, third electromagnetic radiation concurrently with providing the first electromagnetic radiation with the first head; detecting, with a third electrode positioned adjacently to the second platter, the third electromagnetic radiation having interacted with at least a subset of a second group of biological cells positioned with the second platter; and determining, with the one or more processors, one or more impedance values for the subset of the second group of biological cells based on the third electromagnetic radiation detected by the third electrode.

In some embodiments, the method 700 includes rotating the second platter while the third electromagnetic radiation is being provided so that a plurality of biological cells of the second group receive the third electromagnetic radiation sequentially. In some embodiments, the first platter and the second platter are rotated concurrently.

Some embodiments may be described with respect to the following clauses.

Clause 1: A device for analyzing biological cells, the device comprising:
  a first platter for positioning a first group of biological cells;
  a first head positioned adjacently to the first platter for providing first electromagnetic radiation to at least a first subset of the first group of biological cells; and
  a first electrode positioned adjacently to the first platter for detecting the first electromagnetic radiation having interacted with the first subset of the first group of biological cells for determining impedance values for the first subset of the first group of biological cells.

Clause 2: The device of clause 1, wherein:
  the first electromagnetic radiation is microwave electromagnetic radiation.

Clause 3: The device of clause 2, wherein:
  the first head includes an oscillator for generating the microwave electromagnetic radiation.

Clause 4: The device of any of clauses 1-3, further comprising:
  a first platter actuator for rotating the first platter while the first head provides the first electromagnetic radiation.

Clause 5: The device of any of clauses 1-4, further comprising:
  a first head actuator for moving the first head relative to the first platter.

Clause 6: The device of any of clauses 1-5, further comprising:
  a first electrode actuator for moving the first electrode relative to the first platter.

Clause 7: The device of any of clauses 1-6, wherein:
  the first head is configured to change a frequency of electromagnetic radiation provided by the first head.

Clause 8: The device of any of clauses 1-7, including:
  a second head, distinct from the first head, positioned at a location distinct from a location of the first head and adjacently to the first platter for providing second electromagnetic radiation; and
  a second electrode positioned at a location distinct from a location of the first electrode and adjacently to the first platter for detecting the second electromagnetic radiation having interacted with at least a second subset of the first group of biological cells for determining impedance values for the second subset of the first group of biological cells.

Clause 9: The device of clause 8, wherein:
  the first head and the second head are configured to provide electromagnetic radiations having a corresponding frequency.

Clause 10: The device of clause 8, wherein:
  the first electromagnetic radiation has a first frequency and the second electromagnetic radiation has a second frequency that is distinct from the first frequency.

Clause 11: The device of any of clauses 1-10, further comprising:
  a second platter for positioning a second group of biological cells distinct from the first group of biological cells;
  one or more heads positioned adjacently to the second platter for providing electromagnetic radiation to at least a third subset of the second group of biological cells; and
  one or more electrodes positioned adjacently to the second platter for detecting the electromagnetic radiation, from the one or more heads, having interacted with the third subset of the second group of biological cells for determining impedance values of the second subset of the second group of biological cells.

Clause 12: The device of any of clauses 1-11, further comprising:
  a reference platter without biological cells thereon; and
  one or more electrodes positioned adjacently to the reference platter for detecting electromagnetic radiation.

Clause 13: The device of any of clauses 1-12, further comprising:
one or more processors; and
memory storing instructions for:
receiving electrical signals indicative of one or more impedance values for the first subset of the first group of biological cells;
determining the one or more impedance values for the first subset of the first group of biological cells from the received electrical signals; and
storing the one or more impedance values for the first subset of the first group of biological cells.

Clause 14: A method, comprising:
providing, with a first head positioned adjacently to a first platter, first electromagnetic radiation to at least a first subset of a first group of biological cells positioned with the first platter;
detecting, with a first electrode positioned adjacently to the first platter, the first electromagnetic radiation having interacted with at least the first subset of the first group of biological cells; and
determining, with one or more processors, one or more impedance values for the first subset of the first group of biological cells based on the first electromagnetic radiation detected by the first electrode.

Clause 15: The method of clause 14, further comprising:
rotating the first platter while the first electromagnetic radiation is being provided so that a plurality of biological cells of the first group receive the first electromagnetic radiation sequentially.

Clause 16: The method of clause 15, further comprising:
changing a frequency of the first electromagnetic radiation while the first platter rotates.

Clause 17: The method of any of clauses 14-16, further comprising:
providing, with a second head positioned adjacently to the first platter, second electromagnetic radiation concurrently with providing the first electromagnetic radiation with the first head;
detecting, with a second electrode positioned adjacently to the first platter, the second electromagnetic radiation having interacted with at least a second subset of the first group of biological cells; and
determining, with the one or more processors, one or more impedance values for the second subset of the first group of biological cells based on the first electromagnetic radiation detected by the second electrode.

Clause 18: The method of clause 17, wherein:
the first electromagnetic radiation has a first frequency and the second electromagnetic radiation has a second frequency that is distinct from the first frequency.

Clause 19: The method of any of clauses 14-18, further comprising:
providing, with a third head positioned adjacent to a second platter, third electromagnetic radiation concurrently with providing the first electromagnetic radiation with the first head;
detecting, with a third electrode positioned adjacently to the second platter, the third electromagnetic radiation having interacted with at least a subset of a second group of biological cells positioned with the second platter; and
determining, with the one or more processors, one or more impedance values for the subset of the second group of biological cells based on the third electromagnetic radiation detected by the third electrode.

Clause 20: The method of clause 19, further comprising:
rotating the second platter while the third electromagnetic radiation is being provided so that a plurality of biological cells of the second group receive the third electromagnetic radiation sequentially.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the principles and the various described embodiments with various modifications as are suited to the particular use contemplated.

What is claimed is:
1. A device for analyzing biological cells, the device comprising:
a first platter for positioning a first group of biological cells;
a first head positioned adjacently to the first platter for providing first electromagnetic radiation to at least a first subset of the first group of biological cells;
a first head actuator for moving the first head relative to the first platter; and
a first electrode positioned adjacently to the first platter for detecting the first electromagnetic radiation having interacted with the first subset of the first group of biological cells for determining impedance values for the first subset of the first group of biological cells, wherein the first head is positioned above the first platter and the first electrode is positioned under the first platter, or vice versa, with lateral locations of the first head and the first electrode corresponding to each other.

2. The device of claim 1, wherein:
the first electromagnetic radiation is microwave electromagnetic radiation.

3. The device of claim 2, wherein:
the first head includes an oscillator for generating the microwave electromagnetic radiation.

4. The device of claim 1, further comprising:
a first platter actuator for rotating the first platter while the first head provides the first electromagnetic radiation.

5. The device of claim 1, further comprising:
a first electrode actuator for moving the first electrode relative to the first platter.

6. The device of claim 1, wherein:
the first head is configured to change a frequency of electromagnetic radiation provided by the first head.

7. The device of claim 1, including:
a second head, distinct from the first head, positioned at a location distinct from a location of the first head and adjacently to the first platter for providing second electromagnetic radiation; and
a second electrode positioned at a location distinct from a location of the first electrode and adjacently to the first platter for detecting the second electromagnetic radiation having interacted with at least a second subset of the first group of biological cells for determining impedance values for the second subset of the first group of biological cells.

8. The device of claim 7, wherein:
the first head and the second head are configured to provide electromagnetic radiations having a corresponding frequency.

9. The device of claim 7, wherein:
the first electromagnetic radiation has a first frequency and the second electromagnetic radiation has a second frequency that is distinct from the first frequency.

10. The device of claim 1, further comprising:
a second platter for positioning a second group of biological cells distinct from the first group of biological cells;
one or more heads positioned adjacently to the second platter for providing electromagnetic radiation to at least a third subset of the second group of biological cells; and
one or more second electrodes positioned adjacently to the second platter for detecting the electromagnetic radiation, from the one or more heads, having interacted with the third subset of the second group of biological cells for determining impedance values of the third subset of the second group of biological cells.

11. The device of claim 1, further comprising:
a reference platter without biological cells thereon; and
one or more second electrodes positioned adjacently to the reference platter for detecting electromagnetic radiation.

12. The device of claim 1, further comprising:
one or more processors; and
memory storing instructions for:
receiving electrical signals indicative of one or more impedance values for the first subset of the first group of biological cells;
determining the one or more impedance values for the first subset of the first group of biological cells from the received electrical signals; and
storing the one or more impedance values for the first subset of the first group of biological cells.

13. The device of claim 1, further comprising:
a second electrode paired with a second head and positioned adjacently to the first platter, wherein the second electrode is configured to detect second electromagnetic radiation produced by the second head; and
a third electrode paired with a third head and positioned adjacently to a second platter, wherein the third electrode is configured to detect third electromagnetic radiation produced by the third head.

14. The device of claim 1, wherein the first head comprises a coil.

15. The device of claim 1, wherein the first head comprises an inductor and a capacitor.

16. The device of claim 1, wherein the first head comprises a set of electrodes, a metallic interlayer, and a field generation layer.

* * * * *